US006730723B2

(12) United States Patent
Frick et al.

(10) Patent No.: US 6,730,723 B2
(45) Date of Patent: May 4, 2004

(54) SILOXANE RELEASE AGENTS FOR THE PRODUCTION OF DERIVED TIMBER PRODUCTS

(75) Inventors: Theodore Frick, Moon Township, PA (US); Ernst-Martin Hoppe, Bergisch Gladbach (DE); Donald Larimer, Bergisch Gladbach (DE); Andreas Pielasch, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 81 days.

(21) Appl. No.: 10/053,391

(22) Filed: Jan. 17, 2002

(65) Prior Publication Data

US 2003/0073799 A1 Apr. 17, 2003

(30) Foreign Application Priority Data

Jan. 22, 2001 (DE) .......................... 101 02 689

(51) Int. Cl.[7] ................................. C08L 1/00
(52) U.S. Cl. .................. 524/35; 264/338; 264/299; 427/387; 156/331.4; 156/331.7; 525/480; 525/452; 525/540; 428/447; 428/450; 428/537.1; 524/837; 528/31; 528/32; 528/12
(58) Field of Search .................. 264/338, 299; 427/387; 156/331.4, 331.7; 525/480, 452, 540; 428/447, 450, 537.1; 524/837, 35; 528/31, 32, 12

(56) References Cited

U.S. PATENT DOCUMENTS

| 3,445,420 | A | * | 5/1969 | Kookootsedes et al. |
| 4,692,292 | A | | 9/1987 | Kollmeier et al. .......... 264/126 |
| 5,179,143 | A | * | 1/1993 | Konig et al. |
| 5,302,330 | A | | 4/1994 | Umansky et al. ........... 264/109 |
| 5,977,279 | A | | 11/1999 | de Montigny et al. ........ 528/15 |
| 6,210,523 | B1 | | 4/2001 | Schmidt et al. .......... 156/331.4 |
| 2002/0061365 | A1 | * | 5/2002 | Grape et al. |

FOREIGN PATENT DOCUMENTS

| EP | 0 176 640 | 4/1986 |
| EP | 0 819 735 | 1/1998 |
| EP | 1 038 898 | 9/2000 |

* cited by examiner

*Primary Examiner*—Kuo-Liang Peng
(74) *Attorney, Agent, or Firm*—Joseph C. Gil; Lyndanne M. Whalen

(57) ABSTRACT

Derived timber products are produced by hot pressing lignocellulose-containing materials bonded with a polyisocyanate binder. In this process, a mixture of organosilicon compounds satisfying specified compositional requirements is applied to the surfaces of the pressing tool facing the lignocellulose-containing material to be pressed.

7 Claims, No Drawings

SILOXANE RELEASE AGENTS FOR THE PRODUCTION OF DERIVED TIMBER PRODUCTS

BACKGROUND OF THE INVENTION

The present invention relates to a process for producing derived timber products by hot pressing lignocellulose-containing materials bonded with binder in which a mixture of organosilicon compounds is applied to the surface of the pressing tool facing the material to be pressed.

In the production of derived timber products by hot pressing lignocellulose-containing materials with a binder, polyisocyanates, especially polymeric diphenylmethane diisocyanate (pMDI), are used as the binder mainly in the middle layer. If pMDI is used in the outer layer, problems occur when separating the derived timber product from the pressing tool, or a troublesome layer of residues of release agent and derived timber product builds up on the surfaces of the pressing tool, especially when working at relatively high pressing temperatures (EP-A 634 433, EP-A 1 038 898).

There was therefore a need for a release agent suitable for pMDI-containing binder systems that exhibits an adequate release action at relatively high pressing temperatures, and that causes only minor residues of release agent and/or derived timber product on the pressing tool surface even over relatively long production times.

SUMMARY OF THE INVENTION

It has now been found that a release layer which is effective at pressing temperatures and leaves only a minor residue on the pressing tool and timber product can be produced by curing a mixture of organosilicon compounds satisfying the requirements specified herein, without an additional curing catalyst, at pressing temperatures of from 150° C. to 240° C. on the surface(s) of the pressing plate(s) or pressing belt(s) facing the material to be pressed.

DETAILED DESCRIPTION OF THE INVENTION

The mixture of organosilicon compounds used in the process of the present invention as the release layer includes:
a) at least one organopolysiloxane having at least 2 unsaturated hydrocarbon groups A),
b) at least one methyl hydrogen polysiloxane B),
c) at least one non-reactive organopolysiloxane C),
d) optionally, an inhibitor D),
e) optionally, an emulsifier and/or thickener E),
f) optionally, additives and/or auxiliary substances F), and
g) water as diluent.

Similar mixtures containing a catalyst which includes an element of the platinum group, have been proposed in EP-A 819 735 for the coating of baking papers.

Aqueous emulsions which include organopolysiloxane A), methyl hydrogen polysiloxane B), organopolysiloxane C), inhibitor D), an emulsifier and/or thickener E) are particularly preferred release compositions for the process of the present invention. Additional components F) may be added to components A), B) and/or C) before the emulsification or subsequent to the emulsification. Suitable apparatus for achieving an adequate particle size for the stability of the emulsion are known. Examples of such apparatus include high-pressure homogenizers, colloid mills and the like.

The release agents useful in the practice of the present invention can also be used in mixed binder systems (mixed bonding) composed of pMDI and an aqueous solution of condensation products of formaldehyde with urea and/or melamine and/or phenol which have predominantly been used in the derived timber products industry. A mixing ratio of from 1:10 to 10:1, preferably from 1:5 to 5:1, can be maintained without the release action of the release system being impaired.

The organopolysiloxane having at least 2 unsaturated hydrocarbon groups A) within the scope of the invention is preferably a cyclic, linear or branched polysiloxane containing units of the general formula $$(R)_a(R^1)_b SiO_{(4-a-b)/2} \qquad (I)$$

in which

R=a $C_2$–$C_8$-alkenyl and/or unsaturated $C_3$–$C_{10}$-ether radical, such as vinyl, allyl, 1-butenyl, 1-hexenyl and/or —$CH_2$—$CH_2CH_2OCH_2CH$=$CH_2$, etc., preferably vinyl or allyl, most preferably vinyl;

$R^1$=a monovalent, saturated, optionally substituted hydrocarbon radical having up to 10 carbon atoms selected from the group of substituted and unsubstituted alkyl, aryl and arylalkyl radicals, a is an integer within the following limits: $0 \leq a \leq 3$, b is an integer within the following limits: $0 \leq b \leq 3$, and $0 \leq a+b \leq 4$ and each individual R or $R^1$ within the molecule may be identical or different.

Examples of $R^1$ include: methyl, ethyl, propyl, isopropyl, butyl, octyl, etc., cyclobutyl, cyclopentyl, cyclohexyl, etc., phenyl, tolyl, xylyl, naphthyl, etc., benzyl, phenylethyl, and phenylpropyl groups. In one embodiment of the invention, some or all of the hydrogen atoms of the alkyl, aryl and arylalkyl radicals $R^1$ are substituted by fluorine and/or chlorine, bromine, or iodine atoms and/or cyano radicals. In this embodiment, $R^1$ corresponds, for example, to chloromethyl, trifluoropropyl, chlorophenyl, dibromophenyl, β-cyanoethyl, β-cyanopropyl or γ-cyanopropyl radicals. At least 90% of the radicals $R^1$ are preferably methyl, however.

In a preferred embodiment of the invention, a is 0 or 1.

Using the nomenclature known to the person skilled in the art, where $M=(CH_3)_3SiO_{1/2}$, $D=(CH_3)_2SiO_{2/2}$, $T=(CH_3)SiO_{3/2}$, $M^{Vi}=(CH_2=CH)(CH_3)_2SiO_{1/2}$ and $D^{Vi}=(CH_2=CH)(CH_3)SiO_{2/2}$, the following may be given as examples of component A): $M_2D_{100}D^{Vi}_3$, $M^{Vi}_2D_{180}$, $M^{Vi}MD_{100}D^{Vi}_3$, $T_5D_{550}M^{Vi}_7$, $T_3D_{500}M^{Vi}_2M_3$ and/or $T_6D_{300}D^{Vi}M_4M^{Vi}_4$.

The molar amount of unsaturated radicals of type R can be chosen as desired.

In component A), the molar amount of unsaturated radicals of type R should be preferably from 0.01 to 10 mmol./g, more preferably from 0.05 to 1 mmol./g and most preferably from 0.1 to 0.7 mmol./g of component A). The viscosity of component A) at 25° C. is preferably from 10 to 100,000 mPa·s, more preferably from 50 to 10,000 mPa·s.

In a preferred embodiment of the invention, component A) is any of the organopolysiloxanes described in DE-A 43 28 657. Since these polysiloxanes are branched, the ratio of the number of diorganosiloxy units (D units) to the number of branching points is on average from 15 to 40, at least one triorganosiloxy unit (M unit) and not more than half of all M units are free of unsaturated radicals. The remaining M units each carry only one unsaturated radical, and the content of unsaturated radicals is from 0.1 to 1 mmol./g.

The branching points of component A) are preferably monoorganosiloxy units, that is to say trifunctional siloxy units (T units), some of which may, however, also be replaced by tetrafunctional siloxy units ($SiO_{4/2}$ units, Q units).

The terminal groups, free of unsaturated radicals, of the branched organopolysiloxane act as an internal plasticizer. The flexibility of the crosslinked film can be controlled via the number of terminal groups (M units) that are free of unsaturated radicals.

Examples of the preferred component A) are compounds of the formulae $T_5D_{200}M^{Vi}_5M_2$, $T_7D_{280}M^{Vi}_5M_4$, $T_6D_{180}D^{Vi}_2M^{Vi}_4M_4$ and/or $T_8D_{250}M^{Vi}_7M_3$.
Branched organopolysiloxanes having at least 2 unsaturated hydrocarbon groups A) can be prepared by conventional processes, such as, for example, by hydrolysis of chlorosilanes and subsequent polymerization with low molecular weight cyclic diorganopolysiloxanes.

The methyl hydrogen polysiloxane B) preferably contains units corresponding to the general formula $$H_c(R^2)_dSiO_{(4-c-d)/2} \quad (II)$$

in which $R^2$=a monovalent, saturated, optionally substituted, hydrocarbon radical having up to 10 carbon atoms selected from the group of substituted and unsubstituted alkyl, aryl, arylalkyl and/or $C_2$–$C_8$-alkenyl radicals, c is an integer $0 \leq c \leq 3$, preferably $0 \leq c \leq 1$ and d is an integer $0 \leq d \leq 2$, provided that $0 \leq c+d \leq 4$.

The methyl hydrogen polysiloxanes B) are preferably linear. At least half of the D units preferably have hydrogen atoms bonded directly to silicon ($H(CH_3)SiO$ groups). The number of groups having hydrogen atoms bonded directly to silicon is preferably from 70 to 85% of the difunctional units.

The molar amount of hydrogen atoms bonded directly to a silicon atom in component B) can be chosen as desired—within the scope of the above-mentioned structural limitations.

In component B), the molar amount of hydrogen atoms bonded directly to a silicon atom is preferably from 0.01 to 17 mmol., more preferably from 0.1 to 17 mmol., and most preferably from 1 to 17 mmol. per gram of component B).

Examples of component B) include compounds represented by the formulae $M^H_2D_{10}$, $M_2D_{10}D^H_{10}$, $M^H_2D^H_{20}D_{10}$, $M^{Vi}_2D^H_{11}$ and/or $M_2D^{Vi}_3D^H_8$, in which $M^H$=$H(CH_3)_2SiO_{1/2}$ and $D^H$=$H(CH_3)SiO_{2/2}$.

Components A) and B) are preferably present in relative amounts such that the molar ratio of hydrogen atoms bonded directly to a silicon atom (SiH) in component B) to the unsaturated radicals (Si-vinyl) in component A) is from 0.05 to 20, more preferably from 0.5 to 10 and most preferably from 1 to 3.

The organopolysiloxane C) within the scope of the present invention is preferably a polysiloxane containing units corresponding to the general formula $$(R^1)_eSiO_{(4-e)/2} \quad (III)$$

in which $R^1$=a monovalent, saturated, optionally substituted hydrocarbon radical having up to 10 carbon atoms selected from the group of substituted and unsubstituted alkyl, aryl and arylalkyl radicals, which radicals $R^1$ may be identical or different within the molecule, and e may be an integer from 0 to 3.

Component C) is preferably a linear polydimethylsiloxane terminated by trimethylsiloxy groups, such as that which is marketed by Bayer AG under the name Baysilone®-Öle M. Special preference is given to the use of Baysilone®-Öle M having a viscosity from 50 $mm^2s^{-1}$ to 5000 $mm^2s^{-1}$.

The expression "inhibitor D)" within the scope of the present invention includes all inhibitors known in the prior art, such as, for example, maleic acid and its derivatives, amines, alkyl isocyanurates and acetylenically unsaturated alcohols in which the OH group is bonded to a carbon atom adjacent to the C—C triple bond (described in greater detail, for example, in U.S. Pat. No. 3,445,420). Component D) is preferably 2-methyl-3-butyn-2-ol, 1-ethynylcyclohexanol and/or (±) 3-phenyl-1-butyn-3-ol. The amount of component D) in the mixture is preferably from 0.0001 to 5 wt. %, more preferably from 0.01 to 2 wt. % and most preferably from 0.1 to 1 wt. %, based on the total weight of the mixture.

Component E), in principle, includes all emulsifiers and/or thickeners suitable for the formation and stabilization of emulsions. (See, e.g., McCutcheon's Detergents and Emulsifiers, International Edition.) Where emulsions are used to produce release coatings for the production of derived timber products to be used in the foodstuffs sector, preference is given to those emulsifiers mentioned in FDA Regulations 176.170 "Components of Paper and Paperboard". Special preference is given to emulsifiers and thickeners that are mentioned in Recommendation XV of the Bundesgesundheitsamt (BGA) [federal health department], if the derived timber products are intended for use in transport crates for foodstuffs or in the superstructures of lorries.

Examples of suitable emulsifiers and thickeners E) include $C_8$–$C_{22}$-alkyldimethylbenzylammonium chloride (preferably in an amount not exceeding 1.5 wt. %), sodium lauryl sulfate (preferably in an amount not exceeding 0.5 wt. %), polyethylene glycol ethers of monohydric aliphatic alcohols $C_{12}$–$C_{20}$- and $C_2$–$C_9$-alkylphenols, polyethylene glycol esters of natural fatty acids $C_8$–$C_{22}$ and vegetable oils, and/or partially acetylated polyvinyl alcohol having less than 20% acetyl groups and a K value of over 40. The amount of emulsifiers and/or thickeners E) should preferably not exceed 10 wt. %, based on components A), B) and C).

Emulsifiers that fall within BGA Recommendation XV also include: carboxymethylcellulose, decomposed starches, alginates, casein, hard paraffin and wax dispersions, dispersions based on mixed polymers of acrylic acid esters and methacrylic acid esters, butadiene and styrene, provided they are in accordance with Recommendation XIV, and/or polyvinyl alcohol (viscosity of a 4% aqueous solution at 20° C. at least 4 cP), according to Recommendation XIV).

Special preference is given to polyvinyl alcohol in combination with sodium lauryl sulfate or alkyldimethylbenzylammonium chloride.

Additives and auxiliary substances F) within the scope of the invention include: polysiloxane resins composed of constituents of the general formulae (I) and (II); and fillers, such as, diatomaceous earths, finely divided quartz powders, amorphous silicas, pyrogenic and/or precipitated silicas having a BET surface area of from 50 to 500 m$^2$/g. Such fillers may be surface-modified, for example, by reaction with organosilicon compounds such as hexamethyldisilazane or 1,3-divinyl-1,1,3,3-tetramethyldisilazane. The use of fillers is particularly advantageous when the release agent is applied not by spraying but by means of rollers.

Additives and auxiliary substances F) within the scope of the invention are also flow agents, which help to improve the wetting of the substrate with the emulsion. There are suitable for that purpose, for example, polyether siloxanes ("silicone surfactants and/or fluoro-surfactants"). Germ-inhibiting agents (e.g. formaldehyde-cleaving products) are also to be included in the additives and auxiliary substances F).

The amount of component F), or the sum of the components F), is preferably less than 5 wt. %, based on the total mixture.

According to the invention, aqueous emulsions having the following constituents are preferably used:

as component A): $T_8D_{250}M^{Vi}_7M_3$ as methyl hydrogen polysiloxane B): $M_2D^H_{30}D_{10}$ as organopolysiloxane C): polydimethylsiloxane of viscosity 1000 mm$^2$/s as inhibitor D): ethynylcyclohexanol as emulsifier and/or thickener E): polyvinyl alcohol, optionally in combination with sodium lauryl sulfate and as additives and/or auxiliary substances F): germ-inhibiting agents and/or polyether siloxane.

In accordance with the present invention, derived timber products are produced by hot pressing lignocellulose-containing materials bonded with binder containing polyisocyanate. During the production, a release agent according to the invention is applied, for example with the aid of a spray device or of a roller application device, to the pressing plates or pressing belts on the surface facing the material to be pressed. The release agent according to the invention can be applied undiluted in the form of an emulsion having a water content of preferably from 50 to 60 wt. %, more preferably from 55 to 60 wt. %, but it is preferably diluted with water in a ratio of from 1:50 to 1:100. With suitable pre-treatment of the pressing belts, higher rates of dilution are also possible, for example from 1:150 to 1:250. In sum, the water content in the release agents useful in the present invention is in practice preferably from 50 to 99.85 wt. %, most preferably from 55 to 99.85 wt. %.

The release agent is applied and then cured at a temperature of from 150° C. to 240° C., preferably from 180° C. to 240° C. At the beginning of a production run, the operation is started using a higher concentration of release agent (from undiluted to diluted with water in a ratio of 1:50). Special pre-treatment of the pressing tools is not necessary. During the production process, the release agent is preferably sprayed onto the hot pressing plates or pressing belts continuously.

Having thus described our invention, the following Examples are given as being illustrative thereof. All parts and percentages are parts by weight and percentages by weight, unless otherwise indicated.

EXAMPLES

The following component were used in these examples.

| Component | Description | Amount [wt. %] |
|---|---|---|
| | Release Emulsion I | |
| | An emulsion of components: | |
| A) | $T_8D_{258}M^{Vi}_7M_3$ | 22.3 |
| | $M^{Vi}_2D_{75}D^{Vi}_{12}$ (methylvinyl)-polydimethylsiloxane | 8.0 |
| B) | $M_2D^H_{30}D_{10}$ | 8.6 |
| C) | Polydimethylsiloxane of viscosity 1000 mPa · s (Baysilone-Öl ® M1000) | 1.0 |
| D) | Ethynylcyclohexanol | 0.1 |
| E) | Polyvinyl alcohol (Mowiol ® 4-88, Bayer AG) | 3.0 |
| | Sodium lauryl sulfate | 0.1 |
| F) | Germ-inhibiting agent (Preventol ® D2, Bayer AG) | 0.1 |
| | Water | 56.8 |
| | Release Emulsion II (Comparative) | |
| | An emulsion of components: | |
| A) | Same as in Release Emulsion I | 21.9 + 8.0 |
| C) | Same as in Release Emulsion I | 1.0 |
| E) | Same as in Release Emulsion I | 3.0 + 0.1 |
| F) | Same as in Release Emulsion I | 0.1 |
| G) | Pt-vinylsiloxane complex dissolved in component A containing 1320 ppm platinum | 9.1 |
| | Water | 56.8 |

Release Emulsion III (Comparative) [Corresponds to EP-A 819 735]

A blend of 50 parts by weight of Release Emulsion I and 50 parts by weight of Release Emulsion II was prepared.

Isocyanate IV: pMDI having an NCO content of approximately 31.5 wt. % (Desmodur® 44V20 L, Bayer AG)

4000 parts by weight of cover layer chips composed of a mixture of coniferous wood and deciduous wood and having a moisture content of approximately 15 wt. %, were bonded with 320 parts by weight of Isocyanate IV (Desmodur® 44V20 L). A molding having a size of 300×300 mm was produced on a 2 mm thick steel pressing plate and was covered with a second steel pressing plate.

The two pressing plates were pre-treated with the release agent to be tested. To that end, the release emulsion was diluted with water to the given dilution, sprayed onto the plates in a crosswise motion, and then exposed to air for two minutes at 140° C. for the purposes of curing. That operation was repeated three times.

The molding was pressed at the given pressing temperature for 100 seconds. The release behavior each time the molding was removed from the mold was recorded and evaluated as follows:

| | Release from the plate surface |
|---|---|
| 1a | release is without difficulties, the sheet floats off the plate |
| 1b | release is without difficulties, the sheet does not float off the plate |
| 2 | slight adhesion; sheet can be removed |
| 3 | adhesion; use of slight levering action with spatula |
| 4 | strong adhesion; use of strong levering action with spatula |
| 5 | no release |

| | Deposits on the plate surface |
|---|---|
| 1 | no chip deposits |
| 2 | occasional chip deposits |
| 3 | slight chip deposits |

-continued

| | |
|---|---|
| 4 | moderate chip deposits |
| 5 | pronounced chip deposits |

Each time the molding was removed from the mold, the pressing plates were again sprayed with the release emulsion, without a period of exposure to air.

TABLE 1

Release behavior at 190° C., release emulsion diluted 1:200

| Removal from mold | Release Emulsion I | | Release Emulsion II | | Release Emulsion III | |
|---|---|---|---|---|---|---|
| | Release | Deposits | Release | Deposits | Release | Deposits |
| 1 | 1a | 1 | 3 | 2 | 1a | 3 |
| 2 | 1a | 1 | 3 | 2 | 1a | 2 |
| 3 | 1a | 1 | 1b | 1 | 1a | 2 |
| 4 | 1a | 1 | 1a | 1 | 1a | 2 |
| 5 | 1a | 1 | 1a | 1 | 1a | 2 |
| 6 | 1a | 1 | 1b | 1 | 1a | 2 |
| 7 | 1a | 1 | 3 | 2 | 1a | 1 |
| 8 | 1a | 1 | 3 | 2 | 1a | 1 |
| 9 | 1a | 1 | 3 | 2 | 1a | 1 |
| 10 | 1a | 1 | 3 | 3 | 1a | 1 |
| 11 | 1a | 1 | 4 | 3 | 1a | 1 |
| 12 | 1a | 1 | 4 | 3 | 1a | 1 |
| 13 | 1a | 1 | 4 | 3 | 1a | 1 |
| 14 | 1a | 1 | 4 | 3 | 1a | 1 |
| 15 | 1a | 1 | 4 | 3 | 1a | 1 |
| 16 | 1a | 1 | 4 | 3 | 1a | 1 |

TABLE 2

Release behavior at 220° C., release emulsion diluted 1:100

| Removal from mold | Release Emulsion I | | Release Emulsion II | | Release Emulsion III | |
|---|---|---|---|---|---|---|
| | Release | Deposits | Release | Deposits | Release | Deposits |
| 1 | 1a | 1 | 4 | 2 | 1a | 1 |
| 2 | 1a | 1 | 5 | 5 | 1a | 1 |
| 3 | 1a | 1 | breakage | | 1a | 1 |
| 4 | 1a | 1 | — | — | 1a | 1 |
| 5 | 1a | 1 | — | — | 1a | 1 |
| 6 | 1a | 1 | — | — | 1a | 1 |
| 7 | 1a | 1 | — | — | 1a | 1 |
| 8 | 1a | 1 | — | — | 1a | 1 |
| 9 | 1a | 1 | — | — | 1a | 1 |
| 10 | 1a | 1 | — | — | 1a | 1 |
| 11 | 1a | 1 | — | — | 1a | 1 |
| 12 | 1a | 1 | — | — | 1a | 1 |
| 13 | 1a | 1 | — | — | 1a | 1 |
| 14 | 1a | 1 | — | — | 1a | 1 |
| 15 | 1a | 1 | — | — | 1a | 1 |
| 16 | 1a | 1 | — | — | 1a | 1 |

TABLE 3

Release behavior at 190° C., plates only pre-treated

| | Release Emulsion I | |
|---|---|---|
| Removal from mold | Release | Deposits |
| 1 | 1a | 1 |
| 2 | 1a | 1 |
| 3 | 1a | 1 |
| 4 | 1a | 1 |
| 5 | 1a | 1 |
| 6 | 3 | 1 |
| 7 | breakage | |

Release Emulsion I exhibited an excellent release action which was retained even at higher pressing temperatures and formed no deposits on the pressing tool. Release Emulsion II did not exhibit an adequate release action either at 190° C. or at 220° C.

Release Emulsion I was effective over several operations of removal from the mold even after pre-treatment of the plates only once, without the plates having to be re-sprayed after each removal from the mold. This offers the manufacturer a certain security in the case of failure of the release agent spraying during production.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of derived timber products comprising:

a) applying to at least one surface of pressing tool a mixture of organosilicon compounds comprising:
   1) at least one organopolysiloxane having at least 2 unsaturated hydrocarbon groups,
   2) at least one methyl hydrogen polysiloxane,
   3) at least one non-reactive organopolysiloxane,
   4) optionally, an inhibitor,
   5) optionally, an emulsifier and/or thickener,
   6) optionally, an additive and/or auxiliary substance, and
   7) water, b) introducing a lignocellulose-containing material to which a polyisocyanate binder has been applied into the pressing tool, and c) applying sufficient pressure to the lignocellulose-containing material to produce the derived timber product.

2. The process of claim 1 in which the temperature during step c) is from 150° C. to 240° C.

3. The process of claim 1 in which the mixture of organosilicon compounds is applied to the surface of the pressing tool before each pressing operation.

4. The process of claim 1 in which a release layer is produced on the surface of the pressing tool facing the material to be pressed by thermal curing of the applied mixture of organosilicon compounds before step c) is first carried out.

5. The process of claim 1 in which the binder applied to the lignocellulose-containing material is a polymeric diphenylmethane diisocyanate.

6. The process of claim 5 in which the binder applied to the lignocellulose-containing material further includes a binder based on a urea/formaldehyde resin and/or a melamine/formaldehyde resin and/or a phenol/formaldehyde resin.

7. The process of claim 1 in which the binder applied to the lignocellulose-containing material further includes a binder based on a urea/formaldehyde resin and/or a melamine/formaldehyde resin and/or a phenol/formaldehyde resin.

* * * * *